(12) United States Patent
Tabaczynski

(10) Patent No.: US 9,775,195 B2
(45) Date of Patent: Sep. 26, 2017

(54) CAPACITIVE SENSING SYSTEM

(75) Inventor: Michael Tabaczynski, Northville, MI (US)

(73) Assignee: TK Holdings Inc., Auburn Hills, MI (US)

( * ) Notice: Subject to any disclaimer, the term of this patent is extended or adjusted under 35 U.S.C. 154(b) by 2376 days.

(21) Appl. No.: 12/541,826

(22) Filed: Aug. 14, 2009

(65) Prior Publication Data

US 2010/0038351 A1    Feb. 18, 2010

Related U.S. Application Data

(60) Provisional application No. 61/136,178, filed on Aug. 15, 2008.

(51) Int. Cl.
*H05B 1/00*     (2006.01)
*H05B 1/02*     (2006.01)
*B60L 1/08*     (2006.01)

(52) U.S. Cl.
CPC .............. *H05B 1/0238* (2013.01); *B60L 1/08* (2013.01)

(58) Field of Classification Search
CPC .................................................. H05B 1/0238
See application file for complete search history.

(56) References Cited

U.S. PATENT DOCUMENTS

| | | | |
|---|---|---|---|
| 5,772,686 A | 6/1998 | Caruana | |
| 7,042,690 B2 * | 5/2006 | Male | 361/62 |
| 7,500,536 B2 * | 3/2009 | Bulgajewski et al. | 180/273 |
| 2004/0113634 A1 * | 6/2004 | Stanley et al. | 324/661 |
| 2006/0164254 A1 | 7/2006 | Kamizono et al. | |
| 2006/0187038 A1 | 8/2006 | Shieh et al. | |
| 2008/0100425 A1 * | 5/2008 | Kiribayashi | 340/425.5 |
| 2009/0069985 A1 | 3/2009 | Sakai et al. | |
| 2010/0327638 A1 | 12/2010 | Petereit et al. | |

OTHER PUBLICATIONS

U.S. Notice of Allowance in U.S. Appl. No. 12/541,825 dated Dec. 14, 2011.
U.S. Office Action in U.S. Appl. No. 12/541,829; dated Mar. 16, 2012; 13 pages.

\* cited by examiner

*Primary Examiner* — Eugene Lee
(74) *Attorney, Agent, or Firm* — Gordon & Rees LLP

(57) ABSTRACT

A combined heating system and occupant sensing system for a vehicle seat includes first and second electrodes connected in series and a controller configured to direct a heating current to the first and second electrodes. The controller is configured to isolate the first and second electrodes from the heating current and, at the same time, provide a sensing current to only one of the first and second electrodes.

17 Claims, 6 Drawing Sheets

CAPACITIVE SENSING SYSTEM

CROSS-REFERENCE TO RELATED PATENT APPLICATION

This application claims priority to and the benefit of U.S. Provisional Patent Application No. 61/136,178 filed on Aug. 15, 2008, the entirety of which is herein incorporated by reference.

BACKGROUND

The present disclosure relates generally to the field of capacitive sensors and sensing methods. More specifically, the disclosure relates to capacitive sensors and sensing methods for occupants of a vehicle seat.

SUMMARY

One disclosed exemplary embodiment relates to a combined heating system and occupant sensing system for a vehicle seat. The system includes first and second electrodes connected in series and a controller configured to direct a heating current to the first and second electrodes. The controller is configured to isolate the first and second electrodes from the heating current and, at the same time, provide a sensing current to only one of the first and second electrodes.

Another disclosed exemplary embodiment relates to a combined heating system and occupant sensing system for a vehicle seat. The system includes first and second electrodes and a controller configured to direct a heating current to the first electrode. The controller is configured to isolate the first electrode from the heating current and, at the same time, provide a shield signal to the first electrode.

Another disclosed exemplary embodiment relates to a combined heating system and occupant sensing system for a vehicle seat. The system includes first and second electrodes connected in series and a controller configured to direct a heating current to the first and second electrodes. The controller is configured to isolate the first and second electrodes from the heating current and, at the same time, provide a sensing current to only one of the first and the second electrodes. There is an impedance between the second electrode and another node and the controller is configured to provide a shield signal to the node. A substantially high impedance is coupled between the first and second electrodes.

BRIEF DESCRIPTION OF THE DRAWINGS

The disclosure will become more fully understood from the following detailed description, taken in conjunction with the accompanying drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

A capacitive sensor may be implemented several ways. For example, the alternating current out to a sensing electrode may be measured and used as an indicator of the impedance from the sensing electrode to ground. Further, a seat heater may be used as a capacitive sensor. When capacitive sensors are used as sensors in occupant classification systems, it is important that the measurement does not drift. If there is significant drift, the occupant may not be classified correctly.

In an occupant classification system of a vehicle, the occupant is classified using information from sensors that sense characteristics about the situation on a vehicle seat. Some systems sense the total weight on the seat. When a capacitive sensor is used to classify the occupant, the environment above the seat cover is sensed using various techniques to identify the dielectric and conductive properties of the occupant situation. A conductive sensing element is placed under the seat cover and the impedance from the sensing electrode to ground is an indicator of the occupant situation above the seat cover.

Ideally, the environment below the seat cover does not influence the classification. In many seats, a resistive heater within the seat is essentially a grounded wire. The sensing electrode is placed above the seat heater and if the orientation between the sensing electrode and the heater changes, the offset capacitance will change and have a negative impact on the ability of the system to accurately classify the occupant (e.g., if the empty seat offset of the measurement drifts significantly, the system may not accurately classify the occupant).

Referring generally to the figures, a sensing system (e.g., an occupant sensing system for a seat such as a vehicle seat) using a heater element and a sensing element is shown. The sensing system may include various switches, heaters, sensors, and power supplies. The system may time-multiplex between heating and sensing. The heating/sensing element may be isolated from the battery and ground when sensing. Switches may be used to provide control time-multiplexing between heating and sensing. The heating element is configured to generate heat for a seat when power is supplied to the heating element by a circuit and the sensing elements are configured to generate an electric field when electrical current is supplied to the sensing element by a circuit.

Figure 1:
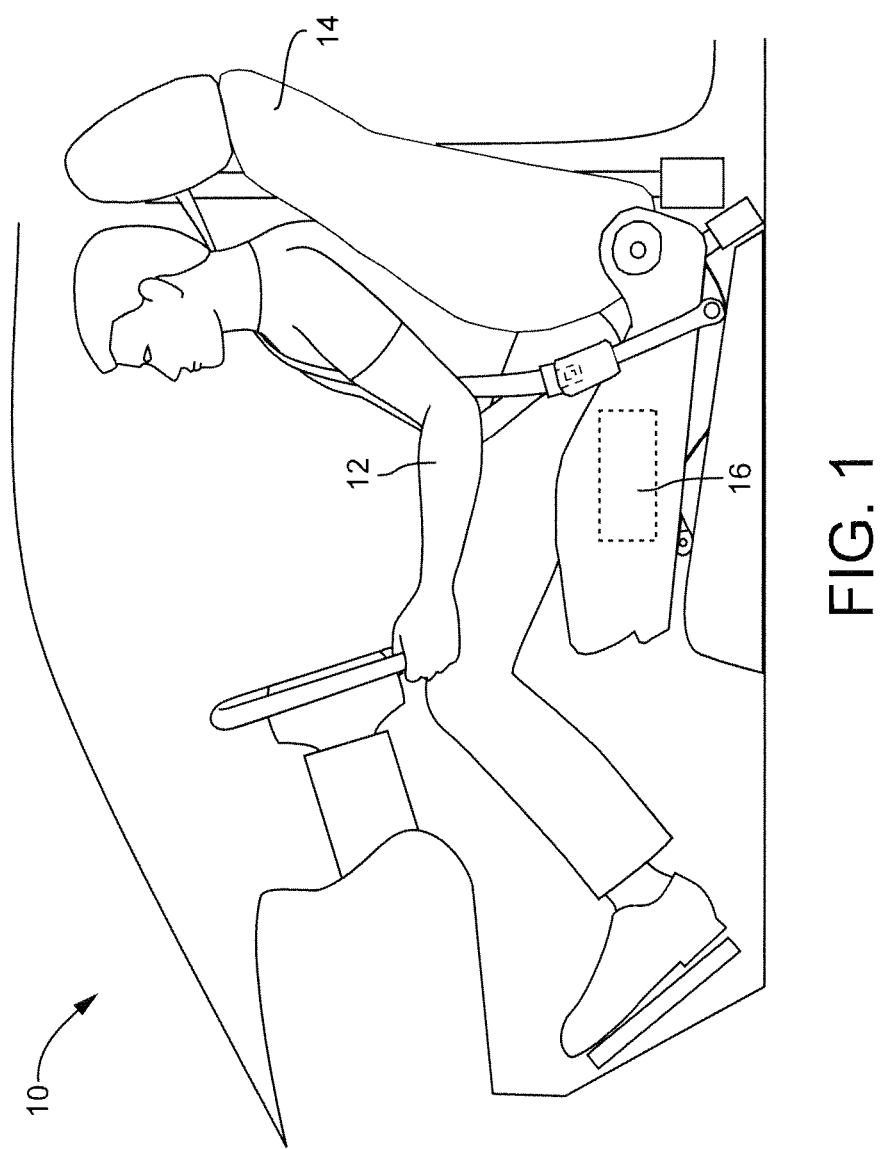
FIG. 1 is a perspective view of a vehicle seat, according to an exemplary embodiment.

Referring to FIG. 1, a vehicle 10 is shown with an occupant 12 in a seat 14 of the vehicle 10, according to an exemplary embodiment. The seat 14 may include an occupant sensing system 16. As shown in FIG. 1, the occupant sensing system 16 may generally be located in the seat 14 below the area in which an occupant 12 of the vehicle 10 sits, or may be located in other areas of the seat 14 or vehicle 10.

The occupant sensing system 16 may generally include a sensor and sensing system for sensing occupancy of the seat 14. For example, the sensor may determine the weight of the occupant in the seat 14 to determine occupancy characteristics. The occupant sensing system 16 may further include a seat heating system and/or other systems for the seat 14 of the vehicle 10. According to one exemplary embodiment, a seat heating system may be used as an occupancy sensing system.

According to an exemplary embodiment, the occupant sensing system 16 includes a capacitive sensor. The capacitive sensor may sense based on measuring a change in capacitance (e.g., changes in the reactive and resistive coupling from the capacitive sensor to ground); the capacitive sensor generally consisting of a conductive object within the occupant sensing system 16 and an object such as an occupant 12. Referring to the present disclosure, the capacitive sensor may be used as an occupancy sensor to detect the presence of an occupant 12 in the seat 14 the occupant sensing system 16 is associated with. As an occupant 12 sits on seat 14, the capacitance change may be used to determine the presence of the occupant 12 by the occupant sensing system 16 or other occupant 12 properties (e.g., weight of the occupant 12).

Figure 2:
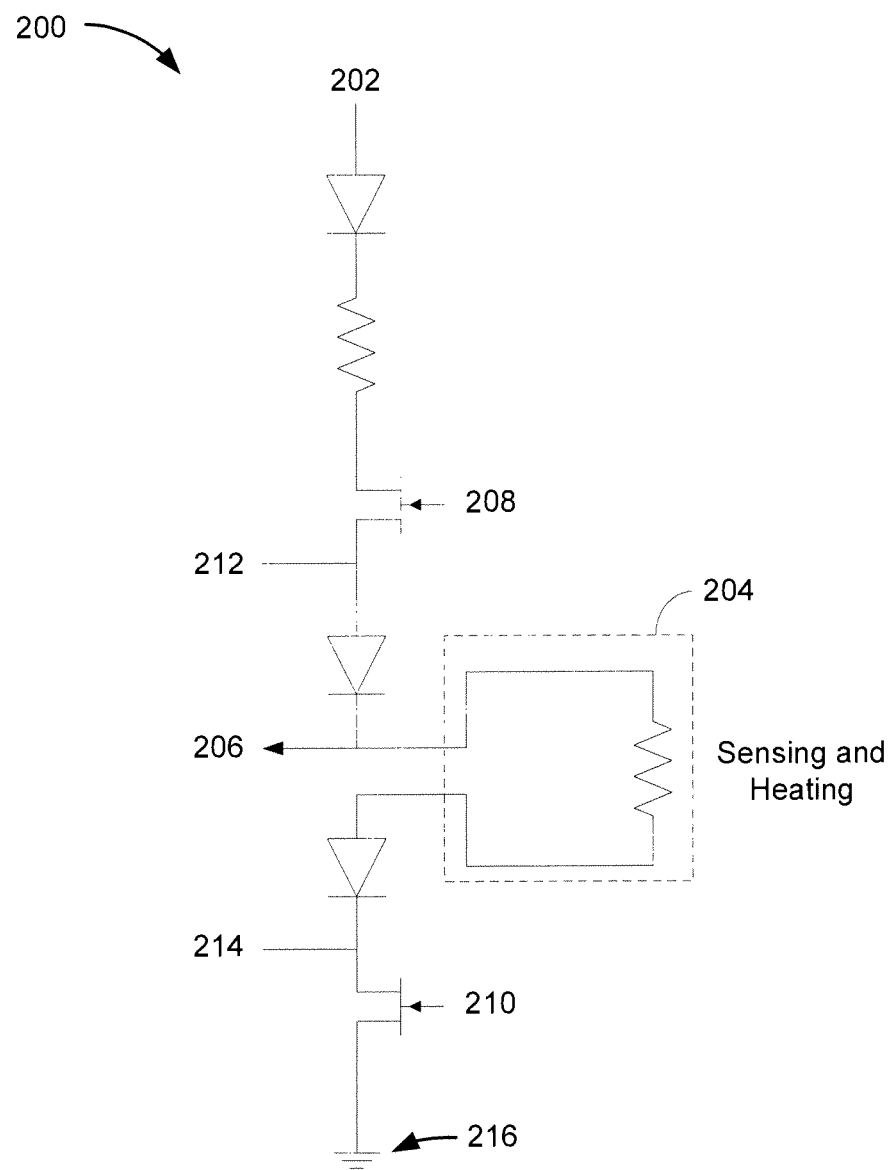
FIG. 2 is a circuit diagram of a sensing system, according to an exemplary embodiment.

Referring to FIG. 2, according to some exemplary embodiments a sensing system 200 may use a heater element as the sensing element and time-multiplex between heating and sensing. The sensing system 200 is shown with a sensor/heat pad 204 with a connection to the sensor circuit portion of the sensing system 206 and two diodes with a diode isolation control signal 212 and a diode isolation control signal 214. The heating/sensing element (e.g., the sensor/heat pad 204) may be isolated from the battery (e.g., a heat power source 202) and the ground 216 when sensing. Electronic switches (e.g., field-effect transistors (FETs) such as the FET 208 for a FET control signal and FET 210 for a low FET control signal, etc.) may be used to provide control of the heating current and help provide isolation impedance between the sensor 204 and both the power source 202 and the ground 216 during sensing when the power source 202 and the ground 216 are disconnected or turned off. The diodes (impedances) are also incorporated to help provide isolation impedance between the sensor 202 and both of the power source 202 and the ground 216. The control signals 212 and 214 also provide isolation in conjunction with the impedances to reduce the measurement error from current flowing to the power source 202 or the ground 216.

A driven shield signal between a pair of isolating impedance elements may be used to reduce the current from the sensing element 204 to the battery 202 or the ground 216. The driven shield signal, or shield signal, is a signal that has similar characteristics to the sensing signal (e.g. same frequency, similar amplitude and phase) such that when the shield signal is across an impedance from the sensing signal, the voltage, and therefore the sensing current, across the impedance is substantially reduced. The heater and the sensor may generally have the same shape and be made of the same material, but they may also have different shapes or be made of different materials. There may still be some current flowing from the sensing electrode to the nodes between the isolation impedances if the driven shield signal is not a perfect reproduction of the sensing signal or sensing voltage. This current may vary over temperature and life and cause offset drifts and subsequent classification errors.

To reduce the influence of the heater, a shield layer may be placed between the sensor and the resistive heater, according to an exemplary embodiment. With the shield, the details of the orientation between the heater and sensor may no longer influence the measurement. The shield may be a driven shield or driven shield layer, for example an electrode or conductor that receives current from a current source to generate an electrical field for cancelling outside electromagnetic noise. According to other exemplary embodiments, the shield may be a passive shield composed at least partially of a material that may block outside electromagnetic noise. This countermeasure may allow the sensor measurement to be influenced by the capacitance between the sensor and the shield. If the spacer thickness between the sensor and the shield changes or the effective dielectric constant of the spacer material changes due to temperature, the sensor measurement may be influenced. The variation of the impedance of isolating elements in the heating control circuit may cause drift.

Figure 3:
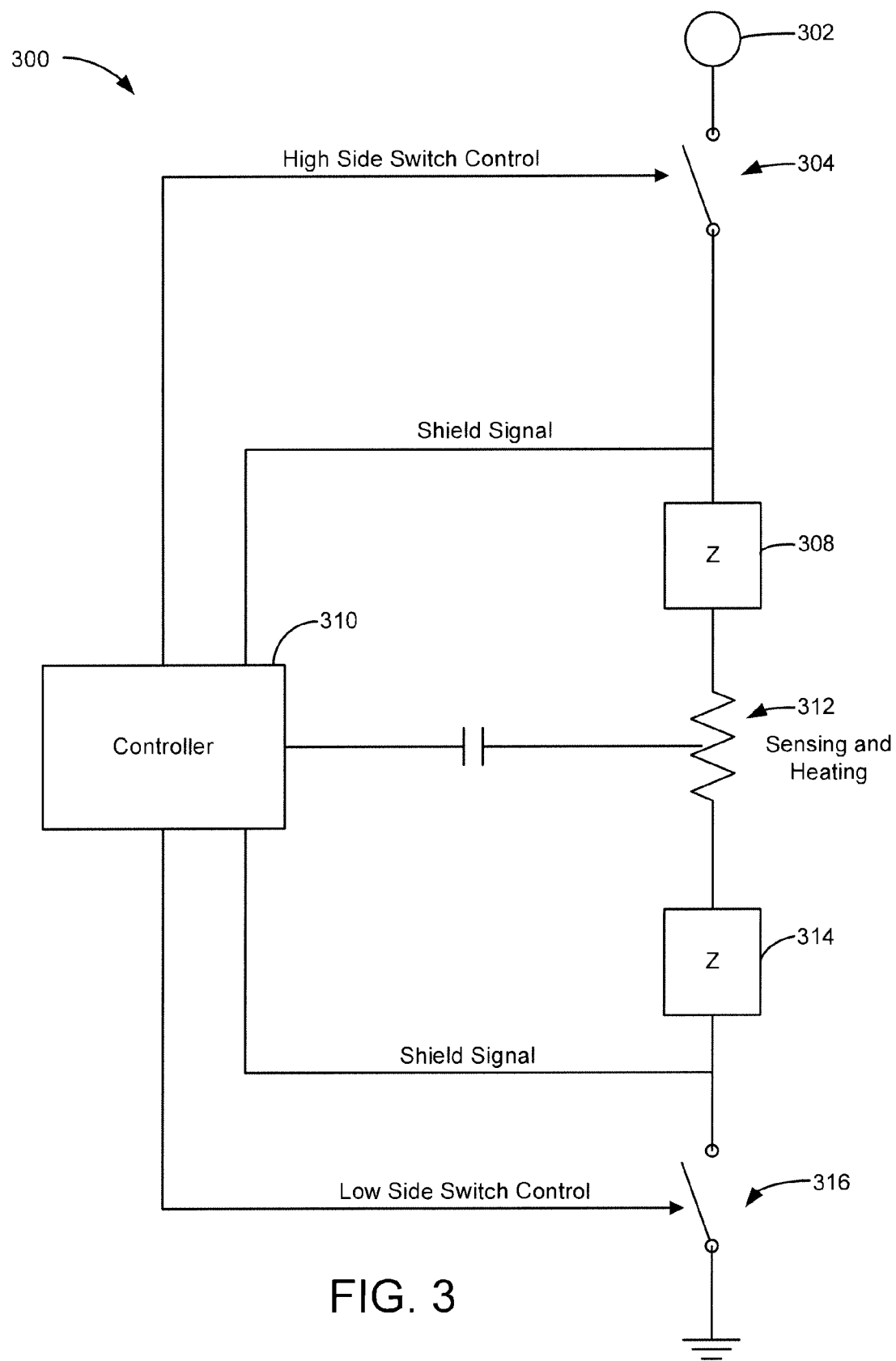
FIG. 3 is a circuit diagram of a sensing system, according to an exemplary embodiment.

Referring to FIG. 3, a circuit diagram of a sensing system 300 is shown, according to an exemplary embodiment. The sensing system 300 includes a power supply 302, a high side switch 304, a low side switch 316, a high side shield isolation 308, and a low side shield isolation 314. The sensing system 300 additionally includes a primary heater 312 and a controller 310, for example including a sensing circuit and a shield driver.

The power supply 302 may supply power to the sensing system 300. The power supply 302 may be any AC or DC power supply. For example, the power supply 302 may be a battery. Additionally, the power supply 302 may be an AC source such as a wall outlet.

The primary heater 312 may be any type of conductor or film capable of heating an area. For example, the primary heater 312 may be a wire, film, conductive sheet, or conductive fabric of any sort. Additionally, other electrically conductive materials may be used.

The controller 310 may be any circuit configuration capable of receiving and outputting power or a signal. Further, the controller 310 may be any hardware or software configuration capable of operating on a received signal. For example, when sensing, the controller 310 may receive a signal from the primary heater 312. The controller 310 may then perform an operation on the received signal, thereby determining the environment above the seat cover.

The high side shield isolation 308 and the low side shield isolation 314 (e.g., impedances) may be any circuit component with a high impedance to the sensing current. Thus, the high side shield isolation 308 and the low side shield isolation 314 coupled with the shield signal, being very similar to the sensing signal, reduces the current flowing through the isolations 308, 314. For example, the high side shield isolation 308 and/or the low side shield isolation 314 may be a diode, inductor, etc.

Figure 4:
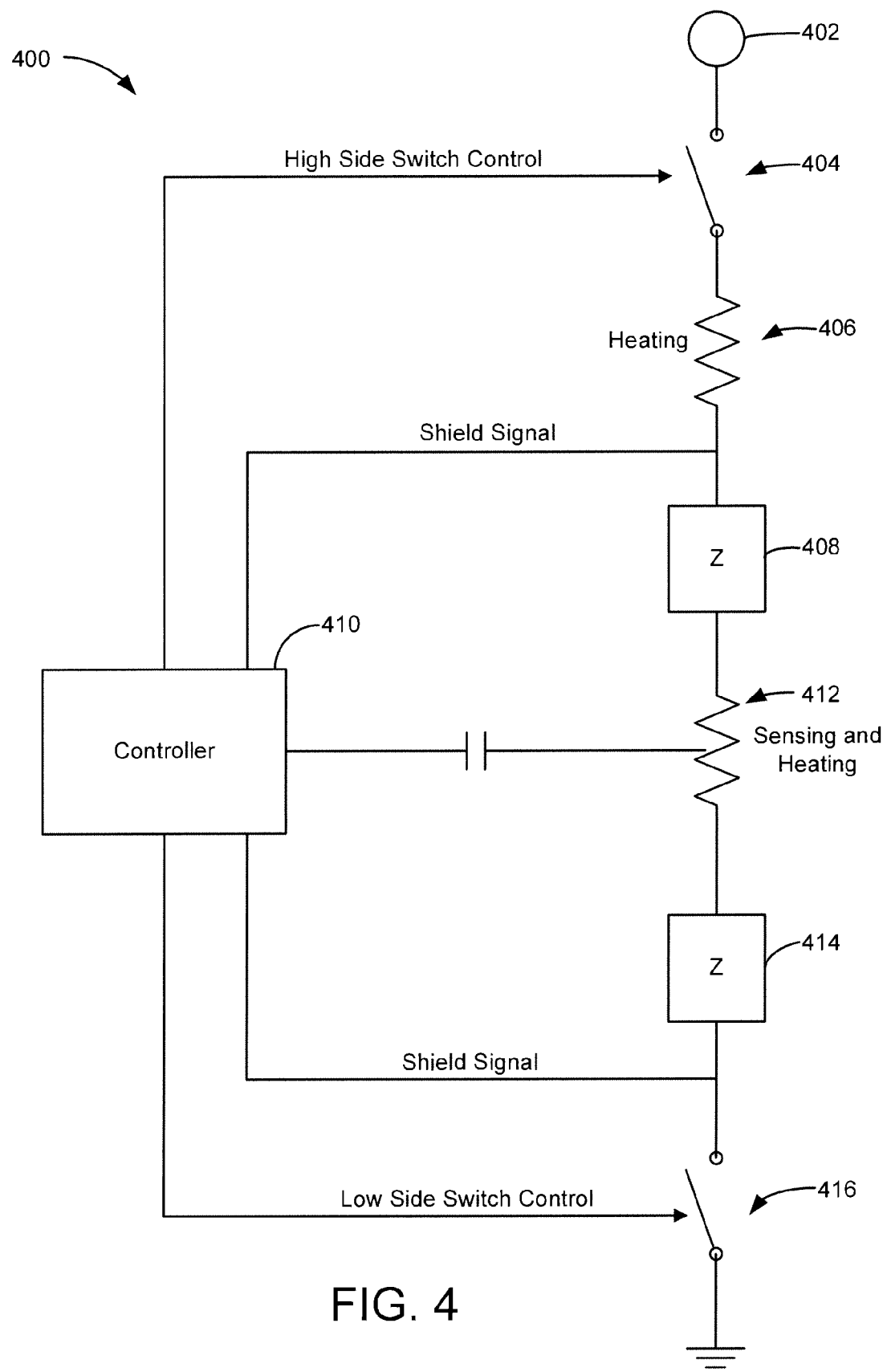
FIG. 4 is a circuit diagram of a sensing system, according to a further exemplary embodiment.

Referring to FIG. 4, a circuit diagram of a sensing system 400 (e.g., a combined heating system and occupant sensing system) is shown, according to an exemplary embodiment. The sensing system 400 includes a power supply 402, a high side switch 404, a low side switch 416, a high side shield isolation 408, and a low side shield isolation 414. The sensing system 400 additionally includes a first electrode or secondary heater 406, a second electrode or primary heater 412, and a controller 410, for example including a sensing circuit and a shield driver.

The sensing system 400 of FIG. 4 additionally includes a secondary heater 406 in series with the primary heater 412. The secondary heater 406 and primary heater 412 may be any type of conductor or film capable of heating an area. For example, the secondary heater 406 may be a wire, film, conductive sheet, a conductive fabric of any sort, or any other conductive material. Additionally, other electrically conductive materials may be used.

According to the embodiment of FIG. 4, the primary heater 412 is located in a separate region than secondary heater 406. Further, when the sensing system 400 is sensing, the primary heater 412 may be used as a sensor. Additionally, while the sensing system 400 is sensing, the secondary heater 406 is not part of the sensor. Thus, the secondary heater 406 may heat a separate region than the primary heater 412, without interfering with sensing. When heating, the secondary heater 406 uses the same current as the primary heater 412. The secondary heater 406 may be used to heat a large portion of a seat bottom, while the primary heater 412 is located in a central region of the seat. Therefore, the region occupied by the secondary heater 406 is heated, but is not used for sensing.

The high side switch 404 and the low side switch 416 may be coupled to the heating elements of sensing system 400 and configured to open or close as necessary, thereby enabling sensing system 400 to begin or end sensing and/or heating. When sensing, the high side switch 404 and the low side switch 416 are opened based on a control signal. Further, when sensing, the controller 410 may provide a shield signal, thereby isolating the primary heater 412 from ground. Additionally, the high side switch 404 and the low side switch 416 may be any type of switch. For example, the high side switch 404 and/or the low switch 416 may be a mechanical type switch, transistor type switch, etc. In the embodiment of FIG. 4, high side switch 404 may be electrically coupled to power supply 402 and low side switch 416 may be coupled to ground.

The controller 410 may be configured to generate the control signal to control the switches 404 and 416. The controller 410 may sense the change in the electric field when controlling the switches 404 and 416 to be open and may drive the primary heater 412 with a sensing signal and the secondary heater 406 with a driven shield signal.

The isolations 408 and 414 (e.g., the impedances) may isolate the primary heater 412 based on the driven shield signal. The isolation 408 may be coupled to the high side switch 404 and the isolation 414 may be coupled to the low side switch 416. The controller 410 may sense the change in the electric field when the shield signal is applied to the nodes away from the primary heater 412, for example the nodes between the isolation 414 and the switch 416 or between the secondary heater 406 and the isolation 408. The isolations 408 and 414 isolate the primary heater 412 from ground when the switches 404 and 416 are open. Stated another way, the isolation 408 may have substantially high impedance, that is an impedance high enough to substantially block current flow between the secondary heater 406 and the primary heater 412, when the switches 404 and 416 are open.

The configuration shown in FIG. 4 in which the sensor/heater element 412 is a separate element in series with a separate heater element 406 has several advantages. The configuration allows the sensor element 412 to cover a separate portion of the seat while allowing the heater elements 406, 412 to cover a larger area of the seat. The separate heating elements 406, 412 may allow for the sensor element 412 to cover a smaller area of the seat, such as for occupant sensing performance while not covering a portion of the seat for which heating is desired but sensing is not. For example, the heater element 406 may be used to heat an outer area or region of the seat bottom where sensing may not be desired. In another example, the heater element 406 may be used to heat the seat back where sensing may not be desired. The series configuration may also provide cost or design advantages if the sensing element has separate characteristics (e.g., separate materials, etc.), which need not be incorporated in the heater element 406. According to some exemplary embodiments, controller 410 may be a single circuit or ECU for driving the sensing and heating element 412, while in other exemplary embodiments controller 410 may use separate heater and sensor circuits or ECUs.

It is noted that while the sensing system 400 is illustrated where the secondary heater 406 may be isolated from the power supply 402 and the primary heater 412 may be isolated from ground using the switches 404, 416 (e.g., electronic switches), according to other exemplary embodiments, the secondary heater 406 may be isolated from ground and the primary heater 412 may be isolated from the power supply 402 using the switches 404, 416.

Figure 5:
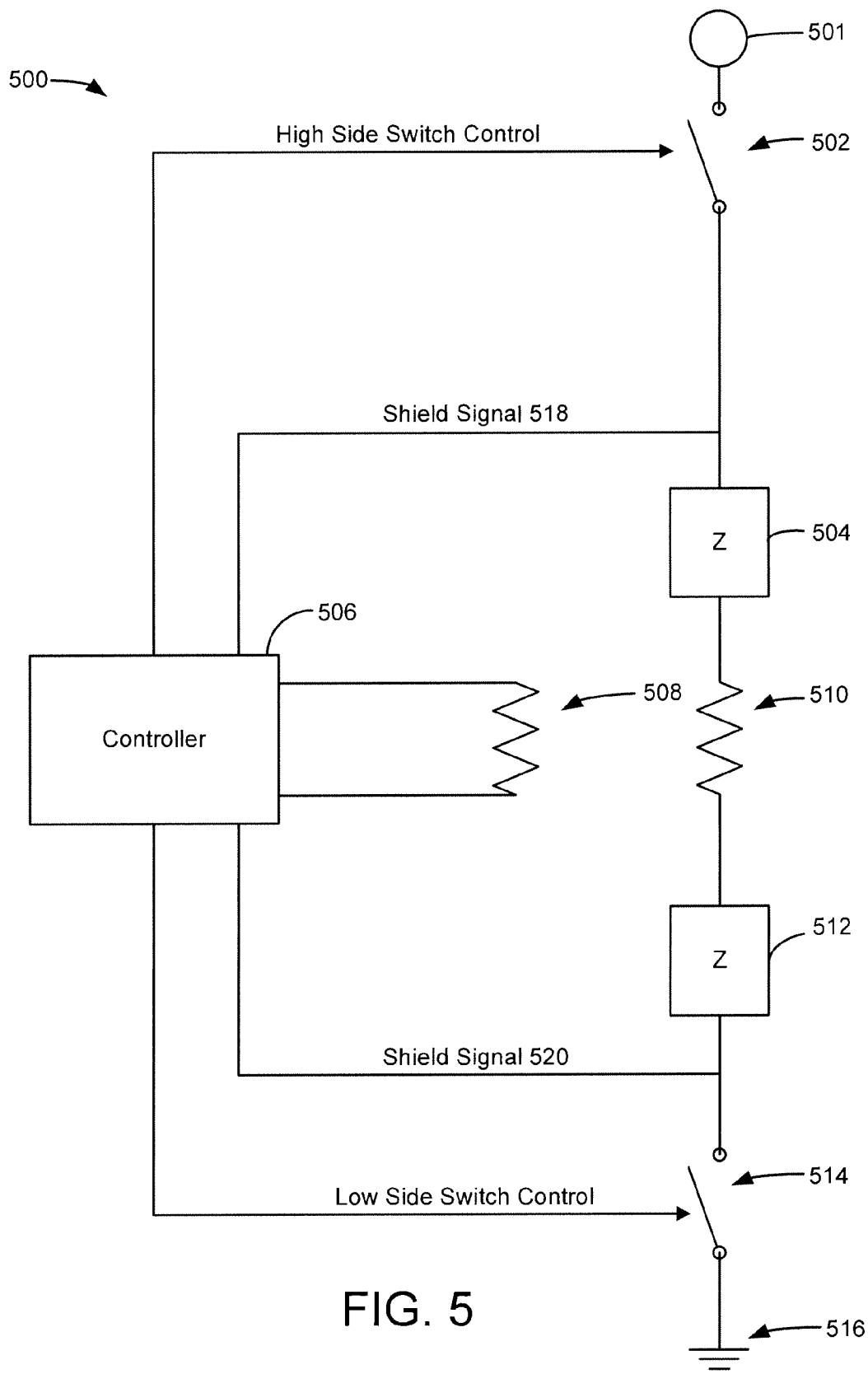
FIG. 5 is a circuit diagram of a sensing system, according to an exemplary embodiment.

Referring to FIG. 5, a circuit diagram of a sensing system 500 (e.g., a combined heating system and occupant sensing system) is shown, according to a further exemplary embodiment. The sensing system 500 includes a power supply 501, a high side switch 502, a low side switch 514, a high side isolating impedance 504, and a low side isolating impedance 512. The sensing system 500 additionally includes a controller 506 (for example including a sensing circuit and a shield driver), a first electrode or heater 510, and a second electrode or sensor 508.

Similar to FIG. 4, the embodiment of FIG. 5 may be configured to use switches and isolation impedances in the high current path of the heater 510. However, the embodiment of FIG. 5 additionally (or alternatively) includes a separate conductor acting as the sensor 508, which is not part of the heating current path. When sensing, the high side switch 502 and the low side switch 514 are opened and a shield signal may be provided by the controller 506 to isolate the heater 510 from a ground 516.

Additionally, the coupling between the sensor 508 and the heater 510 may be small. As a result, there is a limit on the coupling from the sensor to the heater ground. Further, the sensor 508 and the heater 510 are separate conductors. As a result, the sensor 508 may have a different shape and/or be constructed of a different material than the heater 510.

Furthermore, the relative orientation of the sensor 508 with respect to the heater 510 may be varied. For example, when viewed from above the seat surface, the sensor 508 may lie in the same plane as the heater 510 while not overlapping the heater 510. Additionally, when viewed from above the seat surface, the sensor 508 may lie in a different plane than the heater 510, and may or may not overlap the heater 510.

Figure 6:
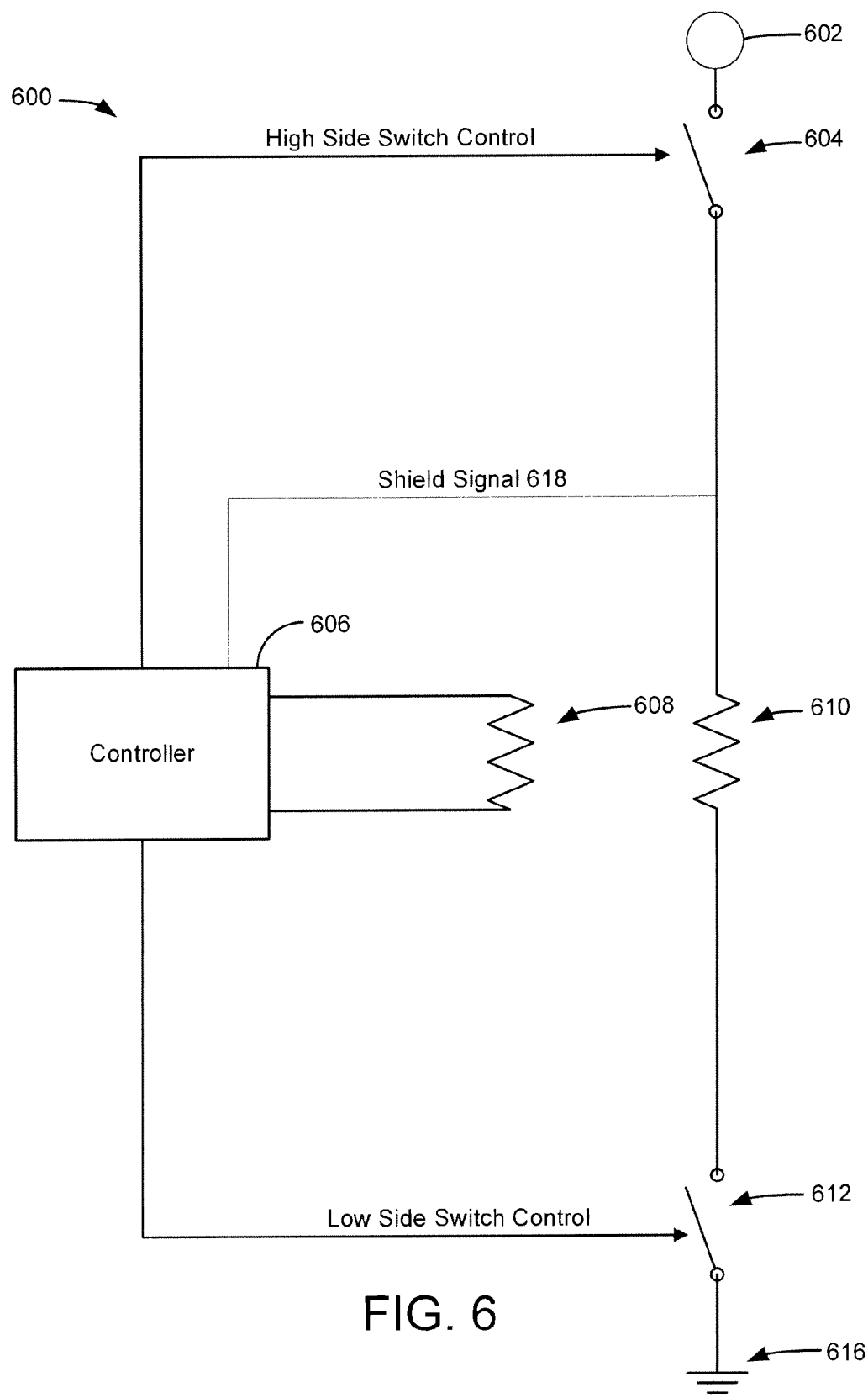
FIG. 6 is a circuit diagram of a sensing system, according to an exemplary embodiment.

Referring to FIG. 6, a circuit diagram of a sensing system is shown, according to a yet further exemplary embodiment. The sensing system 600 includes a power supply 602, a high side switch 604, a low side switch 612, a controller 606 (for example including a sensing circuit and a shield driver), a first electrode or heater 610, and a second electrode or sensor 608.

According to an exemplary embodiment, the heater 610 of heating system 600 is not closely coupled to the sensor 608. Additionally, when sensing, the heater 610 is powered or driven by a shield signal from the controller 606. The sensing system 600 includes switches 604 and 612 which are opened to drive the heater 610 with a shield signal but does not use isolation impedances. Similar to the embodiment of FIG. 5, because the coupling between the sensor 606 and the heater 610 may be small, there may be sufficient limit on the coupling from the sensor to the heater ground such that the configuration of FIG. 6 does not require isolation impedances as are present in FIG. 5.

The sensor 608 and the heater 610 are separate conductors. As a result, the sensor 608 may have a different shape and/or be constructed of a different material than the heater 610. Furthermore, the relative orientation of the sensor 608 with respect to the heater 610 may be varied. For example, when viewed from above the seat surface, the sensor 608 may lie in the same plane as the heater 610 while not overlapping the heater 610. Additionally, when viewed from above the seat surface, the sensor 608 may lie in a different plane than the heater 610, and may or may not overlap the heater 610.

Referring generally to FIGS. 5 and 6, according to various exemplary embodiments, the materials for the sensor and heater may be any type of conductor or film that has an appropriate resistance range for the application, and the sensing element and heating element may be made of different materials. For example wires, conductive films, a conductive sheet of any sort, a conductive fabric of any sort, or any other electrically conductive materials may be used. The exemplary embodiments of FIGS. 5 and 6 allow the sensing element to take a different shape than the heating element.

The configurations shown in FIGS. 5 and 6 implement the sensor element 508, 608 and the shield or heater element 510, 610 in a configuration such that the sensor element is not part of the heating current path. The sensing element 508, 608 is used for occupant sensing but not for heating. The heater element 510, 610 is used for heating but not for sensing. Note that there is an inherent impedance $Z_x$ between the sensor 508, 608 and the heater element 510, 610. For the configuration in FIG. 5, the impedances 504, 512 help provide impedance isolation from the sensor element 508 to the power source 501 or to ground 516 through the impedance $Z_x$. Shield signals 518, 520 also help to provide isolation to reduce current flow to the power source 501 and ground 516. The configuration in FIG. 6 is similar to FIG. 5, except the impedances 504, 512 are not used.

There are several advantages to the configurations of FIGS. 5 and 6. The configurations have an inherent impedance between the sensor 508, 608 and the heater 510, 610. The inherent impedance helps impede current flow from the sensor 508, 608 to the heater 510, 610 and thus to the power source 501, 602 and ground 516, 616, which could otherwise result in measurement error. The inherent impedance enables the configuration shown in FIG. 6 in which additional impedances are not required.

The configurations of FIGS. 5 and 6 allow the sensor element 508, 608 to cover one area of the seat while allowing the heater elements 510, 610 to cover a separate area of the seat. This separation may allow for the sensor element 508, 608 to cover a smaller area of the seat, such as for occupant sensing performance while not covering a portion of the seat for which heating is desired but sensing is not. For example, the heater element 510, 610 may be used to heat the outer area of the seat bottom where sensing may not be desired. In another example, the heater element 510, 610 may be used to heat the seat back where sensing may not be desired.

The configurations of FIGS. 5 and 6 may also provide cost or design advantages. For example, the sensing element 508, 608 design may be optimized for sensing (e.g., smaller wire gauge, separate materials, etc.) while the heating element 510, 610 may be optimized for heating (e.g., thicker wire gauge to handle larger currents). For flexible circuit applications, the heating element 510, 610 may be made up of materials used for self regulated heater mats in which the resistance increases with temperature.

Although the sensing system is illustrated as including multiple features utilized in conjunction with one another, the sensing system may alternatively utilize more or less than all of the noted mechanisms or features. For example, in other exemplary embodiments, there may be more or fewer than the illustrated reference voltages.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

It is also important to note that the construction and arrangement of the elements of the system as shown in the exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A combined heating system and occupant sensing system for a vehicle seat, comprising:
   first and second electrodes electrically connected in series; and
   a controller configured to direct a same heating current to the first and second electrodes,
   wherein the controller is configured to isolate the first and second electrodes from the heating current and, at the same time, provide a sensing current to only one of the first and second electrodes.

2. The system of claim 1, further comprising an impedance between the second electrode and a node, and wherein the controller is configured to provide a shield signal to the node.

3. The system of claim 1, further comprising a substantially high impedance coupled between the first and second electrodes.

4. The system of claim 1, wherein the first and second electrodes are in a same plane or are in separate planes.

5. The system of claim 1, wherein the first electrode is isolatable from a power supply and the second electrode is isolatable from ground using electronic switches.

6. The system of claim 1, wherein the first electrode is isolatable from ground and the second electrode is isolatable from a power supply using electronic switches.

7. The system of claim 1, wherein the second electrode is made of a different material than the first electrode.

8. The system of claim 1, wherein the second electrode is a different shape than the first electrode.

9. The system of claim 1, wherein the first electrode, the second electrode, or a combination thereof comprises a wire, a conductive film, a conductive sheet, or a conductive fabric.

10. The system of claim 1, wherein the second electrode is configured to heat a different portion of the seat than the first electrode.

11. A combined heating system and occupant sensing system for a vehicle seat comprising:
   first and second electrodes electrically connected in series; and
   a controller configured to direct a same heating current to the first and second electrodes,
   wherein the controller is configured to isolate the first and second electrodes from the heating current and, at the same time, provide a sensing current to only one of the first and the second electrodes,
   wherein there is an impedance between the second electrode and a node and the controller is configured to provide a shield signal to the node, and
   wherein a substantially high impedance is coupled between the first and second electrodes.

12. The system of claim 11, wherein the first and second electrodes are in a same plane or are in separate planes.

13. The system of claim 11, wherein:
   the first electrode is isolated from a power supply and the second electrode is isolated from ground using electronic switches; or
   the first electrode is isolated from ground and the second electrode is isolated from a power supply using electronic switches.

14. The system of claim 11, wherein the second electrode is at least one of a different shape than the first electrode and a different material from the first electrode.

15. The system of claim 11, wherein the second electrode is configured to heat a different portion of the seat than the first electrode.

16. The system of claim 1, wherein the controller is configured to receive a signal from the one of the first and second electrodes and to determine an environment above the seat from the signal.

17. The system of claim 11, wherein the controller is configured to receive a signal from the one of the first and second electrodes and to determine an environment above the seat from the signal.

* * * * *